July 18, 1950     B. CYR     2,515,948

THROTTLE DEVICE

Filed April 27, 1946

INVENTOR.
BENJAMIN CYR

BY George H. Fisher
ATTORNEY

Patented July 18, 1950

2,515,948

UNITED STATES PATENT OFFICE 2,515,948

THROTTLE DEVICE

Benjamin Cyr, Minneapolis, Minn., assignor to Minneapolis-Honeywell Regulator Company, Minneapolis, Minn., a corporation of Delaware Application April 27, 1946, Serial No. 665,480

12 Claims. (Cl. 138—45)

My invention is related to a throttle device for retarding the flow of a fluid through a conduit. More particularly the invention is concerned with the construction of an adjustable throttle device which is adapted to be installed in a conventional conduit without requiring special fittings. In fact, the device may be readily mounted in a conduit that has already been installed, without the necessity of having to disjoint the conduit in making the installation.

While the device may have general value for reducing the rate of flow of a fluid through a conduit in any type of fluid system, it has particular value in heating systems which use a circulating medium such as hot water for heating an enclosure. In a hot water heating system using radiators and a connecting pipe system, it is often desirable to retard the rate of flow of the water in the return pipe to obtain the greatest heating efficiency from the hot water. Furthermore, occasion may arise that after such a system has been installed in a dwelling, certain areas of the dwelling do not receive an appropriate amount of heat because of an unequal distribution, or a too rapid return of the hot water to the furnace. While I am aware of the fact that these conditions have been recognized heretofore and that certain steps have been previously taken to correct the condition, it has been the prior art practice to utilize valves or flow retarding devices that require special fittings, which in turn necessitate the troublesome feature of disjointing the pipe system, together with its consequent expense, in order to institute the correction.

According to the present invention a flow retarding member having an adjustable feature may be inserted in the pipe system wherever desired merely by drilling a relatively small aperture in the pipe and inserting a number of parts which can be easily assembled within the pipe. The parts are so shaped that when assembled, the assembly closely approaches a dimension which complies with the interior configuration of the pipe and a substantial throttling effect can be obtained; however, the assembly is adapted for adjustable rotation within the pipe and may even be moved to a point where its flow retarding capacity is practically nil. Because of the simplicity of the parts, the device is not limited in use to correcting the fluid flow through existing erected systems, but is also applicable for use on newly installed systems since it is entirely reliable and is easily installed at any desired point in a conduit.

An object of my invention is to provide a flow retarding device adapted for installation in a jointed conduit without having to disjoint the conduit during the installation. Another object is to provide a flow retarding device adapted for installation in a conduit by passage of parts through an aperture in a side wall of the conduit, which aperture is substantially smaller than the cross dimension of the conduit.

Another object is to provide a flow retarding device formed of a number of members each having one dimension which is substantially common to all of the parts, so that the several parts may be consecutively passed into a conduit through a side wall aperture whose cross dimension only slightly exceeds the substantially common dimension of said several members, and thereafter the several members may be readily assembled within the interior of the conduit.

A further object is to provide an adjustable flow retarding device formed of several members which are adapted to be introduced through an aperture in a conduit, wherein certain of the members are formed to comply with the interior contour of the conduit.

Other and further objects will become apparent from reading of the following description and claims, and from the appended drawing in which:

Figure 1:
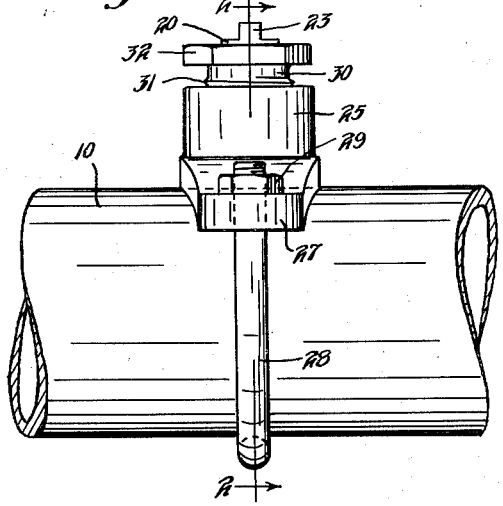
Figure 1 is the side elevation of the device mounted on a conduit.
Figure 2:
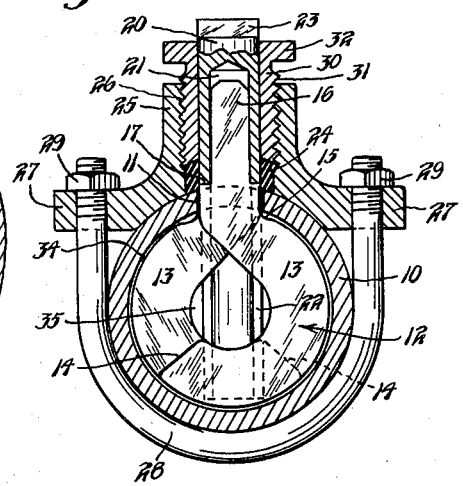
Figure 2 is a cross-section taken approximately on the line 2—2 of Figure 1.

Referring now to the drawing and particularly to Figures 1 and 2, the device will be explained in detail. Reference numeral 10 indicates a conduit and is represented to be a conventional 1½ inch pipe. To receive the parts to be described hereinafter, an aperture 11 has been drilled through the pipe and reamed to remove any remaining burrs. Shown within conduit 10 is a throttle vane 12 which is a composite structure. Throttle vane 12 is principally composed of a pair of identically shaped flow retarding members indicated by reference numerals 13. Each of these members 13 is formed in a tortuous shape resembling a hook with the major part of the curved portion having a common lateral width.

Members 13 are consecutively introduced into the interior of conduit 10 by inserting the end portion 14 through aperture 11 and then rotating the member about an imaginary axis in the center of the curved portion. To provide a substantially cylindrical surface and to permit introducing the final increments of the flow retarding members, each member 13 is provided with a cut out portion 15 near the angular or recurved portion of the hook. Beyond the recurved portion each of the members 13 is formed into portions of narrower width as indicated by reference numeral 16, forming shoulder portions 17. The remainder of throttle vane 12 consists of a stem portion 20 which is provided with a longitudinal aperture 21 extending throughout substantially the entire length of the stem. A pair of slots 22 extend longitudinally through the opposite sides of the stem 20 from one end for a substantial distance. At its other end stem 20 is provided with a tool receiving portion 23 which is useful in rotating throttle vane 12 with respect to the interior of conduit 10. Stem 20 is adapted to slidably fit over members 13 so that the portions 16 thereof will fit into aperture 21 and shoulder portions 17 will abut the closed ends of slots 22 so that a portion of stem 20 extends into the interior of conduit 10, but still leaves a substantial portion extending beyond the exterior of conduit 10.

To provide a fluid tight seal between aperture 11 and stem 20, a pliable gasket 24, formed of rubber or a similar material surrounds stem 20 and abuts the exterior surface of conduit 10. A saddle 25 having a threaded interior portion 26 and two lateral arms 27, slidably fit over stem 20 and gasket 24. A U-shaped bolt 28 which is threaded at each end surrounds the lower portion of conduit 10 and is fastened to saddle 25 by nuts 29. A packing nut 30 having a threaded exterior portion 31 and a hexagonal tool receiving portion 32 fits over stem 20 and threadedly engages the threaded portion 26 of saddle 25, compressing gasket 24 against conduit 10 to seal off the space between aperture 11 and stem 20.

To assemble the throttle vane within the conduit 10, members 13 are consecutively inserted beginning in a lateral direction with respect to the conduit and starting with the end portions 14. When substantially half of the curved part of the hook is inserted they are then turned in a longitudinal direction with respect to the conduit to complete the insertion. After the flow retarding members 13 have been inserted in the conduit, the stem 20 is slidably mounted over their outer surfaces with the portions 16 extending into aperture 21 until the shoulder portions 17 engage the closed ends of slots 22. Thereafter the fastening means including gasket 24, saddle 25 and U-bolt 28 are secured in place by nuts 29. The packing nut 30 is then secured in the threaded portion 26 of saddle 25, but preferably before it is firmly turned, stem 20 is rotated until throttle vane 12 is in its approximately desired position, whereafter tightening packing nut 30 will secure gasket 24 around aperture 11 to prevent leakage of fluid out of conduit 10.

The flow through conduit 10 may then be changed as desired by loosening packing nut 30, turning stem 20 until the desired flow is obtained, and then again tightening packing nut 30.

Figure 4:
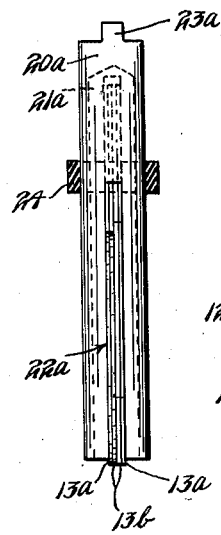
Figure 4 is a side elevation of parts shown in Figure 3, with the parts being rotated through an angle of 90 degrees.

It will be observed in Figure 2 that there is a peripheral opening 34 allowing clearance between the throttle vane 12 and the interior surface of conduit 10. Also there is a small opening 35 between the interior curved surface of each of members 13 and stem 20. The throttle vane 12 is not intended to provide a fluid-tight seal in the conduit and since it is normally in a partially open position the peripheral opening 34 is of no consequence. Likewise the small openings 35 may not be of particular consequence but if they are considered objectionable means are shown in Figures 3, 4 and 6 for also closing off these openings 35.

Figure 3:
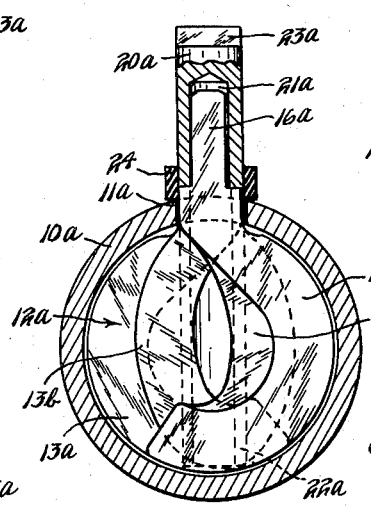
Figure 3 is a partial modification of the device shown in Figure 2.
Figure 6:
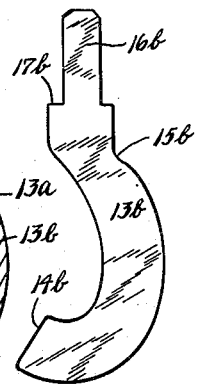
Figure 5:
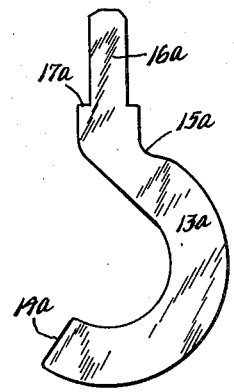
Figure 5 is the side elevation of a flow retarding member shown in Figures 2 and 3; and, Figure 6 is a modified form of flow retarding member shown only in Figure 3.

Figures 3-6 are several views of a modification of the structure shown in Figure 2, and show means for closing off the small openings, such as openings 35, in throttle vane 12. In Figure 3 conduit 10a is shown as having the dimensions of a standard 2 inch pipe, but aperture 11a is substantially the same size as aperture 11, as it is desirable to keep these openings as small as possible. As shown in Figure 3 throttle vane 12a is composed of a pair of flow retarding members 13a one of which is shown in Figure 5, which are of substantially the same lateral width as members 13 but the curved portion of the hook is larger than that of member 13 in that it has been generated for insertion into a larger size conduit. The portions 14a, 15a, 16a and 17a correspond to portions 14, 15, 16 and 17 of members 13. It will be understandable by anyone skilled in the art that when the diameter of conduit 10a increases over that of conduit 10 while the lateral width of the flow retarding members 13a remains substantially the same as that of members 13, the openings in throttle vane 12a, such as openings 35 in Figure 2, would increase in area. To close off these central openings in throttle vane 12a, a pair of flow retarding members 13b, one of which is shown individually in Figure 6, are inserted through aperture 11a to produce the complete closing effect shown in Figure 3. Flow retarding members 13b differ from members 13a only in the extent of the curvature of the hook-shaped portion but it will be noted that they are formed of substantially the same width as members 13a. In other respects, portions 14b, 16b and 17b are substantially the same as portions 14a, 16a and 17a of members 13a. The cut out portions 15b are however not quite as deep as portions 15a because the curvature of the hook-shaped portion is less in members 13b than in members 13a. Likewise stem 20a shown in Figure 4, differs from stem 20 only in its length and in the width of slots 22a, because slots 22a must accommodate a pair of members 13a and also a pair of members 13b. The central aperture 21a and tool receiving portion 23a are identical in stems 20 and 20a.

In actual practice, when aperture 11 has a cross-dimension of one-half inch the width of members 13 (this applies equally to members 13a and 13b) should be approximately $\frac{1}{2}$ inch in width at the end portion 14 in order to enter aperture 11. Stem 20 may be an infinite fraction larger in diameter than the width of members 13 at point 14 but since this difference is negligible it should be regarded as having substantially the same width as the flow retarding members.

Throttle vane 12a is assembled within conduit 11a in substantially the same manner as previously set forth in regard to throttle vane 12. However, as shown in Figure 4 the two flow retarding members 13b are assembled in the center with members 13a on either side thereof. The fastening means used with the modification of Figure 3, are except for dimensions of some parts, the same as shown in Figures 1 and 2, and are assembled and adjusted in the manner previously set forth.

As the foregoing description was intended for illustrative purposes only the extent of my invention is defined by the appended claims.

I claim:

1. A throttle vane comprising, three members each of which has one dimension substantially common to all members to provide for insertion into and assembled within a conduit through an opening whose longest dimension is substantially equal to said common dimension, said opening having an area considerably smaller than the internal cross-sectional area of the conduit, two of said members each conforming to a portion of the contour of the conduit and a third member adjustably holding and positioning said first two members in such a relationship that they collectively form a vane conforming to the interior cross-sectional configuration of the conduit.

2. In combination with a conduit having an aperture in the side wall thereof, a plurality of curved flow retarding members for insertion through said aperture to retard fluid flow through said conduit, one of said members having a curvature different from that of another member whereby when assembled within said conduit said plurality of members form a substantially solid disk whose outer periphery conforms to the interior contour of said conduit.

3. A throttle vane comprising, two flow retarding members and a stem member adapted to be separately inserted into and assembled within a conduit through an opening considerably smaller than the internal cross-sectional area of the conduit, each of said members having one dimension substantially common to all said members which is substantially equal to the longest dimension of said opening in said conduit, said flow retarding members conforming to a portion of the contour of the conduit and said stem member adjustably holding and positioning said flow retarding members in such a relationship that they collectively form a vane conforming to the interior cross-sectional configuration of the conduit.

4. A throttle vane comprising, two flow retarding members and a rotatable stem member for adjustably supporting said flow retarding members in relation to a fluid stream, said members being adapted to be separately inserted into and assembled within a conduit through an opening considerably smaller than the internal cross-sectional area of the conduit, said flow retarding members being adjustably held in position by said stem member in such a relationship that they collectively form a vane conforming to the interior cross-sectional configuration of the conduit, and fastening means for supporting said stem member.

5. A throttle device comprising a stem member and a pair of flow retarding members each having one dimension substantially common to one another such that each member may be individually inserted through an opening into a conduit considerably smaller than the internal cross-sectional area of the conduit and device assembled therein, said common dimension being substantially equal to the longest dimension of said opening in said conduit, said stem and said flow retarding members substantially filling the cross-dimension of said conduit to throttle fluid flow therethrough.

6. A throttle device comprising, a stem member and a pair of flow retarding members each having one dimension substantially common to one another such that each member may be individually inserted through an opening into a conduit considerably smaller than the internal cross-sectional area of the conduit and the device assembled therein, said common dimension being substantially equal to the longest dimension of said opening in said conduit, said stem member having a longitudinal slot extending from one end thereof for a substantial distance, said flow retarding members being adapted for mounting in said slot of said stem member in such a manner as to form a substantially solid cylindrical disk on one end of said stem member.

7. A throttle device comprising, a stem member and a flow retarding member each having one dimension substantially common to one another such that each member may be individually inserted through an opening into a conduit considerably smaller than the internal cross-sectional area of the conduit, said dimension being substantially equal to the longest dimension of said opening in said conduit, said members being adapted for assembly within said conduit in such a relationship that they collectively form a vane conforming to a portion of the interior cross-sectional configuration of the conduit to retard fluid flow therethrough, and fastening means for securing said members in said conduit.

8. A throttle device, comprising a plurality of flow retarding members, each of said members being adapted to be separately inserted into a conduit through an aperture which is substantially smaller than the cross dimension of said conduit and assembled as a throttle device therein, and means also inserted in said aperture to position and hold said members, said members having one dimension which is substantially less than the cross dimension of said aperture and being formed to substantially conform to the interior contour of said conduit.

9. A throttle device comprising a plurality of flow retarding members, each of said members being adapted to be separately inserted into a conduit through an aperture which is substantially smaller than the cross dimension of said conduit and assembled as a throttle device therein, and means also inserted into said aperture to position and retain said flow retarding members, said members having one dimension which is less than the cross dimension of said aperture and being formed to require tortuous admission through said aperture.

10. A throttle device, comprising a plurality of flow retarding members, each of said members being adapted to be separately inserted into a conduit through an aperture which is substantially smaller than the cross dimension of said conduit and assembled therein as a throttle device, said members having one dimension which is less than the cross section of said aperture and being curved to require tortuous admission into the interior of said conduit, and a connection extending from said members to rotate said members when placed within said conduit.

11. A throttle device, comprising a plurality of flow retarding members, each of said members being adapted to be separately inserted into a conduit through an aperture which is substantially smaller than the cross dimension of said conduit, said members having a first dimension which is less than the cross section of said aperture and a second dimension which is greater than the cross dimension of said conduit and means also inserted into said conduit through said aperture to position and retain said flow retarding members.

12. A throttle device comprising a plurality of flow retarding members and a stem member, said stem member having a slotted portion for receiving said flow retarding members, each of said members being adapted to be separately inserted into a conduit through an aperture which is substantially smaller than the cross dimension of said conduit, said members being constructed for assembly within the interior of said conduit by securing said flow retarding members in the slotted portion of said stem member, said flow retarding members being designed to conform to the inner surfaces of said conduit, said stem member and said flow retarding members forming a substantial restriction to fluid flow within said conduit, and means securing said flow retarding members and said stem member within said conduit and sealing said conduit against escapement of said fluid.

BENJAMIN CYR.

REFERENCES CITED

The following references are of record in the file of this patent:

UNITED STATES PATENTS

| Number | Name | Date |
|---|---|---|
| 751,107 | Rettich | Feb. 2, 1904 |
| 1,000,304 | Sliger | Aug. 8, 1911 |
| 2,198,854 | Behringer | Apr. 30, 1940 |
| 2,285,779 | Mueller | June 9, 1942 |